United States Patent
Ewert

(10) Patent No.: US 11,648,899 B2
(45) Date of Patent: May 16, 2023

(54) SENSOR MODULE, SAFETY SYSTEM

(71) Applicant: Robert Bosch GmbH, Stuttgart (DE)

(72) Inventor: Marion Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 1048 days.

(21) Appl. No.: 15/718,015

(22) Filed: Sep. 28, 2017

(65) Prior Publication Data
US 2018/0086295 A1  Mar. 29, 2018

(30) Foreign Application Priority Data

Sep. 29, 2016 (DE) .................. 10 2016 218 871.2
Aug. 31, 2017 (DE) .................. 10 2017 215 270.2

(51) Int. Cl.
*B60R 21/013* (2006.01)
*B60R 21/01* (2006.01)

(52) U.S. Cl.
CPC .. *B60R 21/013* (2013.01); *B60R 2021/01013* (2013.01); *B60R 2021/01211* (2013.01)

(58) Field of Classification Search
None
See application file for complete search history.

(56) References Cited

U.S. PATENT DOCUMENTS

| | | | |
|---|---|---|---|
| 6,605,877 B1* | 8/2003 | Patterson | B60R 21/0155 307/10.1 |
| 2012/0031662 A1* | 2/2012 | Hortig | B81B 7/0064 174/377 |
| 2012/0086442 A1* | 4/2012 | Haas | G01R 33/0041 324/225 |
| 2012/0158335 A1* | 6/2012 | Donovan | G01R 25/00 324/251 |
| 2013/0187646 A1* | 7/2013 | Baca | B64D 11/062 324/262 |
| 2014/0081526 A1* | 3/2014 | Rapp | B60R 21/0136 701/45 |
| 2016/0132091 A1* | 5/2016 | Bodner | G06F 1/06 713/323 |
| 2016/0223370 A1* | 8/2016 | Levy | G01D 18/00 |

* cited by examiner

*Primary Examiner* — Adam D Tissot
*Assistant Examiner* — Garrett F Evans
(74) *Attorney, Agent, or Firm* — Maginot, Moore & Beck LLP

(57) ABSTRACT

The disclosure relates to a sensor module, in particular for a safety system of a motor vehicle, having a carrier substrate, having a plurality of functional units that are arranged on or at the carrier substrate and are electrically connected to one another, wherein at least one functional unit is a sensor, having at least one analog-to-digital converter, having a communication device and optionally having a linearizer and/or compensator. There is provision for only analog functional units to be present as functional units and for the at least one analog-to-digital converter to be connected on the output side directly to the communication device.

14 Claims, 4 Drawing Sheets

SENSOR MODULE, SAFETY SYSTEM

This application claims priority under 35 U.S.C. § 119 to application no. DE 10 2016 218 871.2, filed on Sep. 29, 2016 in Germany, the disclosure of which is incorporated herein by reference in its entirety. This application also claims priority under 35 U.S.C. § 119 to application no. DE 10 2017 215 270.2 filed on Aug. 31, 2017 in Germany.

The disclosure relates to a sensor module, in particular for a safety system of a motor vehicle, having a carrier substrate, having a plurality of functional units that are arranged on or at the carrier substrate and are electrically connected to one another, wherein at least one of the functional units is a sensor, having at least one analog-to-digital converter, having at least one communication device and optionally having at least one linearizer and/or compensator.

The disclosure further relates to a safety system, in particular an airbag system for a motor vehicle, having at least the sensor module described above, having at least one control device, which is connected to the sensor module, and having at least one safety device, wherein the control device is specifically designed to actuate the at least one safety device depending on output signals of the sensor module.

BACKGROUND

It is known to use safety devices to the safety of vehicle occupants and road users outside a motor vehicle, said safety devices detecting a collision or an impending collision with the aid of sensor modules built into the motor vehicle and, when necessary, actuating or triggering one or more safety devices, in order to protect the vehicle occupants and/or other road users from injuries. For example, the airbag system of a motor vehicle constitutes a safety system of this kind. If a rear-end collision that leads, for example, to a deceleration of the motor vehicle that goes beyond a prescribed limit value is detected, a control device of the safety system actuates one or more airbag devices in order to trigger them. For identifying rear-end collisions and/or head-on crashes, acceleration sensors are used nowadays, said acceleration sensors usually being built into the central control device and/or along a bending crossmember of the motor vehicle. For identifying side-on crashes, pressure and/or acceleration sensors are preferably used nowadays, wherein acceleration sensors are usually used at the B, C or D pillars of the motor vehicle and pressure sensors are usually used in the vehicle door. In this case, the amplitude of the output signal of the respective sensor generally serves as the measurement value to be detected, which is crucial for triggering or not triggering a safety device. The amplitude is normally dependent on the mass and the speed of the impacting object. To detect pedestrian collisions, it is known to arrange sensors in the vehicle bumper, such as two or more acceleration sensors or pressure-hose-based systems, for example.

The sensors are normally used in sensor modules, which, in addition to the actual sensor, have functional units for processing the sensor signals. An analog-to-digital converter is also provided for the respective sensor, said analog-to-digital converter converting the analog output signals of the sensor to digital sensor signals, which are processed by digital functional units and fed to a communication interface of the sensor module. The digitized and processed sensor signals are then led to the control device of the safety system by the communication interface, said control device deciding whether a safety device should be actuated or not by comparing a sensor signal or a processed sensor signal with one or more limit values.

SUMMARY

The sensor module according to the disclosure having the features of the disclosure has the advantage that it is more cost-effective and robust than known sensor modules, wherein the processing of the sensor signals by the sensor module is reduced to a minimum. The sensor module preferably performs at least substantially only one conversion of the analog sensor signals to digital sensor signals, in order to forward them to the communication device. For this purpose, there is provision according to the disclosure for only analog functional units to be present as functional units and for the analog-to-digital converter to be connected on the output side only to the communication device. In connection with the present disclosure, an analog functional unit should be understood to be an electrical/electronic functional unit, which converts analog input signals to analog output signals. Accordingly, a digital functional unit should be understood to be an electrical/electronic functional unit, which converts digital input signals to digital output signals. Pure analog signal processing is thus carried out within the sensor module and the digitized output signals are fed directly to the communication device without further preprocessing. As a result, the task of processing the sensor signals is thus transferred to the control device. The sensor module itself is thereby realized in a more simple and cost-effective manner and the computation power of a control device that is present anyway is better utilized.

There is preferably provision for the sensor to be a pressure sensor, acceleration sensor, rotation rate sensor or temperature sensor. In connection with the present application, the sensor should be understood to be a measurement element, such as the piezoresistive measurement element for the pressure sensor or the capacitive measurement element for the acceleration or rotation rate sensor, for example. The measurement elements or sensors detect the physical variables to be determined prior to the analog-to-digital converter. There is further preferably provision for the sensor module to have as sensors at least the temperature sensor and additionally either the pressure sensor, the acceleration sensor or the rotation rate sensor. The additional temperature sensor achieves a situation in which a temperature is detected at the location at which the actual crash sensor (pressure, acceleration or rotation rate sensor) generates or receives the signal that is to be processed. With the aid of the detected temperature at the time at which the pressure, acceleration or rotation rate sensor generates an output signal, said output signal can be calibrated by the control device or an optional linearizer or compensator, with the result that a measurement result that could be distorted by a change in temperature is avoided. Arranging the temperature sensor on the same carrier substrate as the crash sensor ensures that the temperature is detected as close as possible to the crash sensor, with the result that the detected measurement value or the output signal of the crash sensor can be compensated or calibrated as exactly as possible.

There is preferably further provision for a voltage converter to also be arranged on the carrier substrate as the functional unit. The voltage converter ensures the supply of power to the other functional units.

There is preferably further provision for the communication device to have a PSI5 communication interface. The digitized sensor signals can be transmitted by said PSI5 communication interface to the control device securely and quickly in a simple manner.

The sensor module is further preferably distinguished by a housing, in particular a mold housing, an S08 housing or an LGA housing, which expediently at least substantially houses the functional units, the analog-to-digital converter and the communication interface, with the result that they are protected from external influences. The sensor module can also be configured as a film-based sensor module having a carrier substrate of a flexible film, in particular conductive film. It is then possible to dispense with molding-on the individual components, in particular with the aid of flip-chip technology.

There is preferably further provision for the sensor module to be configured to transmit sensor-specific data to an external control device upon initialization. In order for in the data provided by the sensor module to be able to be evaluated by an external control device, it may be necessary for said control device to know sensor-specific data, such as balance point temperatures or a temperature characteristic curves, for example, which have been stored during the final sensor programming on the strip in the sensor. These data that apply precisely to one sensor, in particular balance parameters, from the manufacturing process are then automatically transmitted to the control device upon initialization or during the initialization phase after first incorporating the sensor module and the control device, with the result that smooth interaction between the control device and the sensor module is ensured. In particular, the data flows in this case across the aforementioned PSI5 communication interface. The balance parameters put the control device in a position to carry out temperature linearization of the sensor signal and further calculations.

The safety system according to the disclosure having the features of the disclosure is distinguished by the inventive configuration of the sensor module. This results in the advantages mentioned already. In particular, the communication interface of the sensor module and the control device are configured to communicate with one another by way of a PSI5 protocol.

There is preferably further provision for the control device to have digital functional units, which are configured to digitally process or preprocess the output signal or signals of the sensor module, in particular before the sensor signals are fed to an evaluation algorithm, which decides on triggering or not triggering the safety devices. Hence the essential digital processing measures are installed in the control device.

BRIEF DESCRIPTION OF THE DRAWINGS

Further advantages and preferred features and combinations of features emerge, in particular, from the above description.

The disclosure will be explained in more detail below with reference to the drawing, in which.

DETAILED DESCRIPTION

Figure 1:
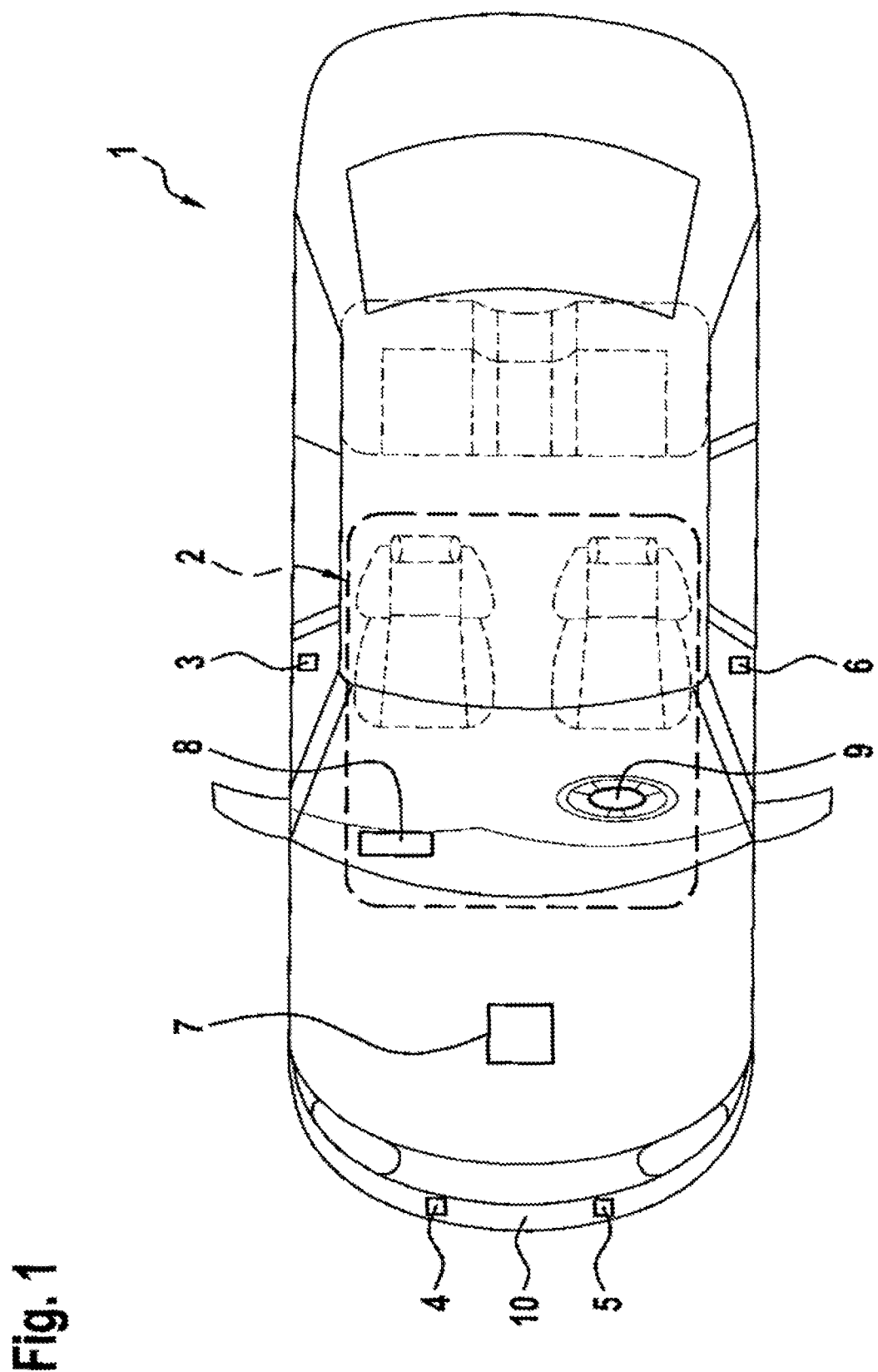
FIG. 1 shows a simplified illustration of a motor vehicle having an advantageous safety system.

FIG. 1 shows a simplified plan view of a motor vehicle 1, which has an advantageous safety system 2. In the present case, said safety system 2 is configured as an airbag system, which has a plurality of sensor modules 3, 4, 5, 6, a control device 7 and a plurality of safety devices 8, 9 in the form of airbag devices in the present case.

The sensor modules 3 to 6 and the safety devices 8 and 9 are each connected to the control device 7, wherein this connection should be understood as an electrical or the signal connection, by means of which, on the one hand, the output signals generated by the sensor modules 3 to 6 are detected and evaluated by the control device 7 and the safety devices 8 and 9 can be actuated by the control device 7 depending on the detected output signals. In this sense, the control device 7 is configured as an airbag control device.

In accordance with the present exemplary embodiment, the sensor modules 3 and 6 are arranged in vehicle doors of the motor vehicle 1 and are configured as pressure sensor modules. The sensor modules 4 and 5 are built into a front-side bumper 10 of the motor vehicle 1 and are configured as acceleration sensor modules. These sensor modules are used, in particular, to detect pedestrian collisions with the motor vehicle 1. A further sensor module, which has a rotation rate sensor, is arranged, in particular, at or on the control device 7.

Corresponding safety systems are already known from the prior art and so the specific use and configuration of the entire system 2 will not be dealt with in more detail at this juncture. It is also self-evident that the safety system 2 can have more or fewer sensor modules 3 to 6 and more or fewer safety devices 8 and 9.

The configuration of the sensor modules 3 to 6 will now be explained in more detail with reference to FIGS. 2 and 3. The design will be discussed here by way of example with reference to the sensor module 3. The other sensor modules 4 to 6 are advantageously configured accordingly.

Figure 2:
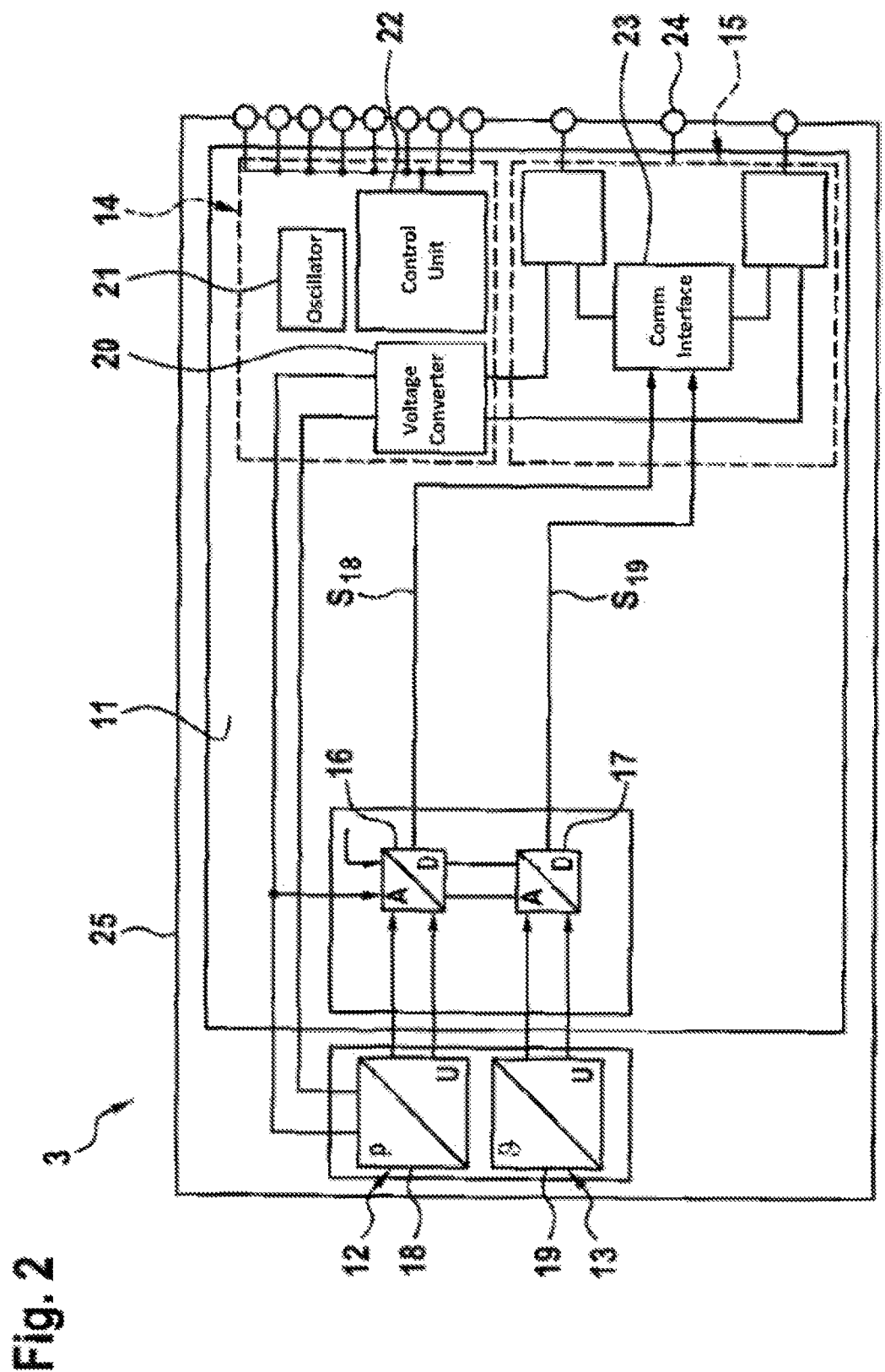
FIG. 2 shows a simplified illustration of an advantageous sensor module of the sensor system.

For this purpose, FIG. 2 shows a simplified illustration of the sensor module 3, which is configured as a pressure sensor module, as already mentioned. To this end, the sensor module 3 has a carrier substrate 11, on or at which a plurality of electrical functional units 12, 13, 14, a communication device 15 and two analog-to-digital converters 16, 17 are arranged and electrically connected to one another, with the result that they form an application-specific integrated circuit.

The functional units 12 and 13 are each configured as a sensor or measurement element, wherein the functional unit 12 is configured as a pressure sensor 18 and the functional unit 13 is configured as a temperature sensor 19. The two sensors (measurement elements) 18, 19 are each connected on the output side to one of the analog-to-digital converters 16, 17, with the result that the output signals of the pressure sensor 18 and the temperature sensor 19 are digitized directly.

The functional unit 14 has a voltage converter 20, which has a bridge circuit, for example, which is actuated by a control unit 22 with which an oscillator 21 is associated, in order to supply the sensors 18, 19 with a desired operating voltage. The oscillator 21 provides the clock for the analog-to-digital converter and for the communication device 15. The control unit 22 has, in particular, a store and is configured as an OTP module. Said store contains, in particular, data for programming the sensor module, which concern, for example, the manner in which the detected data are forwarded by the communication device 15.

The communication device 15 has a communication interface 23, which, in the present case, is configured as a PSI5 communication interface and can be connected to a data bus by means of an output 24, said data bus leading to the control device 7.

The analog-to-digital converters 16, 17 are connected directly to the communication interface 23. Digital sensor signals are thus not postprocessed or preprocessed in the sensor module 3. Instead, the unprocessed digital or digitized sensor signals are fed directly to the communication interface 23, which forwards said signals to the control device 7. The sensor signals are thus processed, in particular evaluated, exclusively in the control device 7 by means of the hardware and software present there. There are thus no digital functional units for processing digitized sensor signals present in the sensor module 3, as a result of which said sensor module can be produced in a robust and cost-effective manner.

In order to protect the elements of the sensor module 3, they are expediently housed by a housing 25, which is preferably configured as a mold housing. Only electrical connection contacts preferably penetrate the housing 25.

Figure 3:
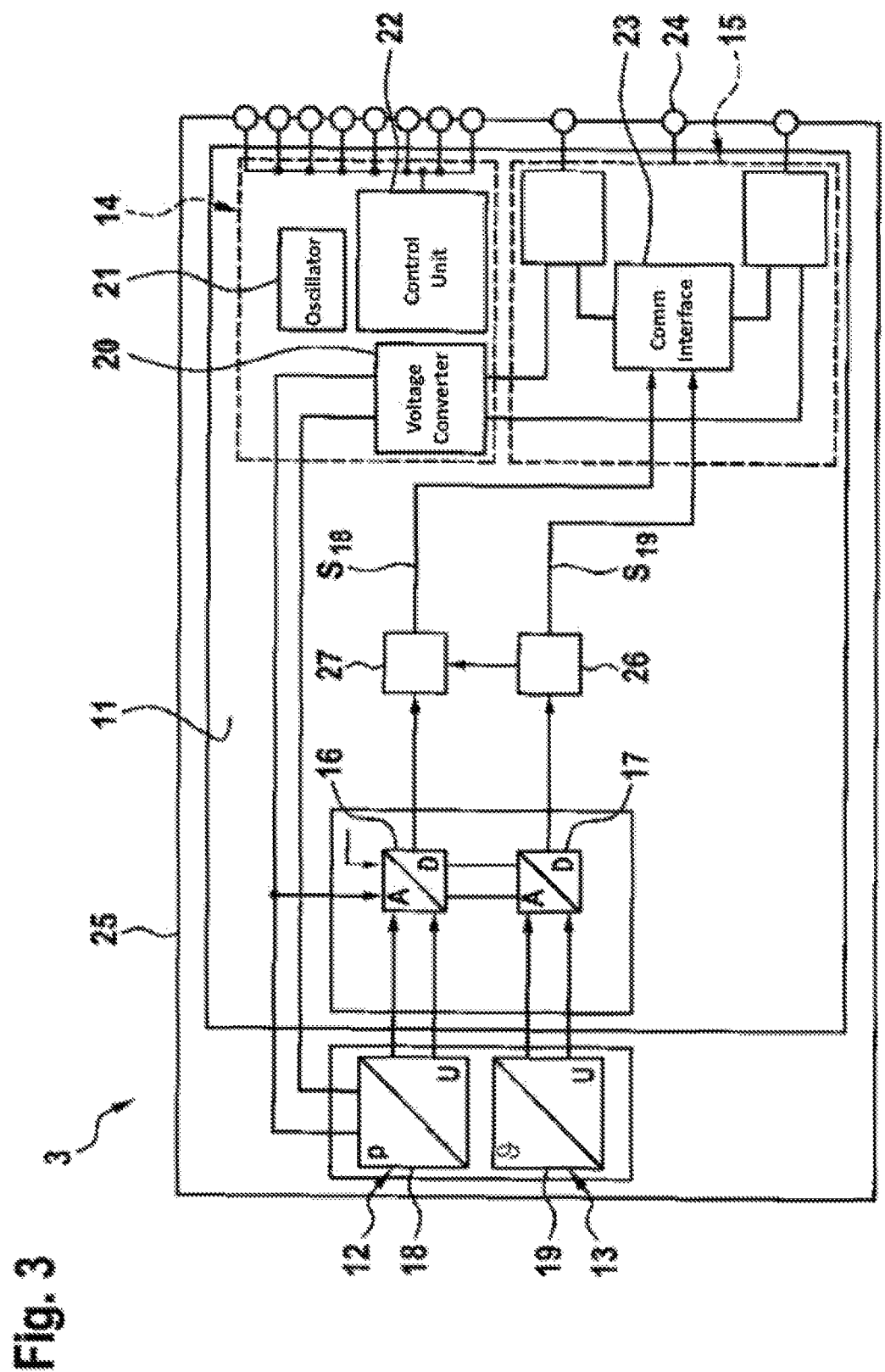
FIG. 3 shows a simplified illustration of the sensor module in accordance with a further exemplary embodiment and FIG. 4 shows a simplified illustration of a control device of the safety system.

FIG. 3 shows a further exemplary embodiment of the sensor module 3, wherein elements already known from FIG. 2 are provided with the same reference numerals and reference is made to the above description in this respect. In contrast to the preceding exemplary embodiment, there is provision for a linearizer 26 to be connected downstream of the analog-to-digital converter 17 and for a compensator 27 to be connected downstream of the analog-to-digital converter 16, wherein the linearizer 26 is connected to the compensator 27, in order to feed a linearized temperature signal to said compensator, said temperature signal being used by the compensator 27 to relativize the output signal of the pressure sensor 18 or to compensate/calibrate the output signal of the pressure sensor depending on the linearized temperature. The sensor signals are thus already preprocessed in a simple manner in the sensor module 3. However, the substantially more complex evaluation furthermore also takes place in the control device 7.

The complex calculations are thus moved from the sensor modules 3, 4, 5, 6 to the control device 7 by way of the advantageous configuration. This has the advantage that, when the output signals of the sensors 18, 19 are intended to be processed differently, for example filtered, interpolated or clipped, for different applications or customers, for example, this can be performed centrally in the control device 7, with the result that always the same sensor module 3 can be built. In particular, specific filter characteristic curves can thus be dynamically adapted. It is possible to disregard the additional load on the control device 7 by the processing of the sensor data because there are usually more resources available in the control device 7 than in a sensor module.

Figure 4:
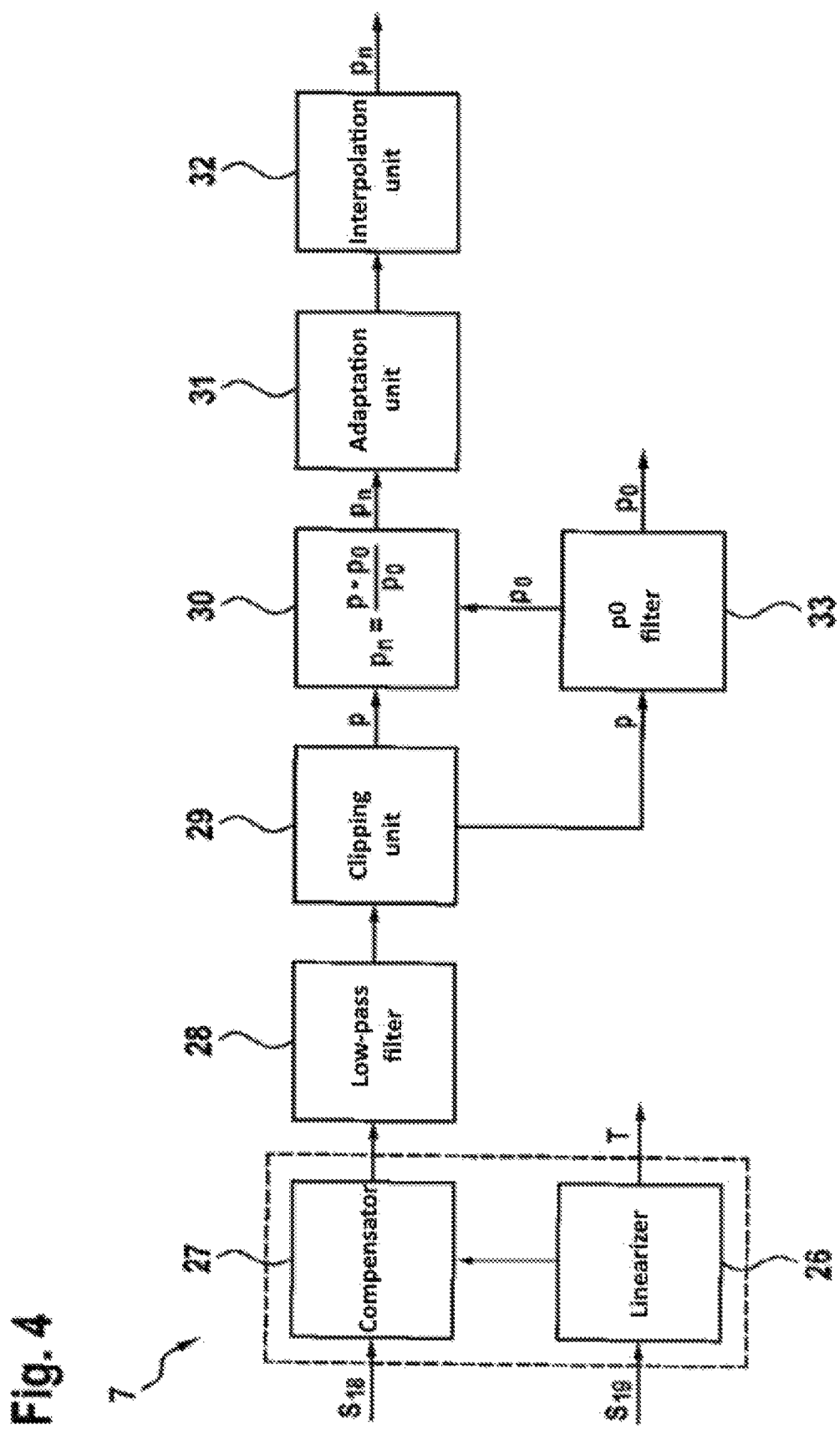

FIG. 4 shows a simplified illustration of a part of the control device 7 that is necessary for processing the detected sensor signals. Said part of the control device first receives the digitized sensor signals $S_{18}$ and $S_{19}$ of the sensor module 3. If the sensor module 3 is configured in accordance with the exemplary embodiment from FIG. 2, the digitized sensor signals $S_{18}$ and $S_{19}$ are first fed to the linearizer 26 and compensator 27 that are now arranged in the control device 7. If the sensor module 3 is configured in accordance with the exemplary embodiment of FIG. 3, the sensor signal $S_{19}$ is fed directly to the trigger algorithm of the control device 7, by means of which a decision is made about whether to trigger or not trigger the airbag devices or the safety devices 8, 9. The sensor signal $S_{18}$ is advantageously first fed to a low-pass filter 28, then to a clipping unit 29. The pressure signal p is then normalized by a normalization unit 30, adapted by an adaptation unit 31 and interpolated by an interpolation unit 32. The pressure signal $p_n$ that then remains is fed to the evaluation algorithm of the control device 7. A p0 filter 33 is also provided for normalizing the sensor signal $S_{18}$.

The units 26 to 33 can be realized in the control device 7 on the hardware side and/or on the software side. The processed output signals are fed to the algorithm or to a microprocessor of the control device that performs the algorithm. In particular, the control device or the microprocessor here compares the interpolated pressure value $p_n$ with a prescribable limit value, in order to decide whether one of the safety devices 8, 9 should be triggered.

What is claimed is:

1. A sensor module for a safety system of a motor vehicle, the sensor module comprising:
   a carrier substrate;
   a plurality of functional units electrically connected to one another and arranged one of (i) on the carrier substrate and (ii) at the carrier substrate, the plurality of functional units including only analog functional units;
   at least one analog-to-digital converter; and
   a communication device connected directly to an output of the at least one analog-to-digital converter,
   wherein at least two functional units of the plurality of functional units are sensors,
   wherein the at least one analog-to-digital converter includes a respective analog-to-digital converter for each of the sensors, and
   wherein at least one functional unit in the plurality of functional units is a voltage converter.

2. The sensor module according to claim 1, wherein the sensors comprise at least two of a pressure sensor, an acceleration sensor, a rotation rate sensor, and a temperature sensor.

3. The sensor module according to claim 1, wherein the communication device has a PSI5 communication interface.

4. The sensor module according to claim 1 further comprising one of:
   a housing; and
   a film-based configuration.

5. The sensor module according to claim 1, wherein the sensor module is configured to transmit sensor-specific data to an external control device upon initialization.

6. The sensor module according to claim 5, wherein the sensor-specific data are stored in the sensor module.

7. A safety system for a motor vehicle, the safety system comprising:
   at least one sensor module comprising:
      a carrier substrate;
      a plurality of functional units electrically connected to one another and arranged one of (i) on the carrier substrate and (ii) at the carrier substrate, the plurality of functional units including only analog functional units;
      at least one analog-to-digital converter; and
      a communication device connected directly to an output of the at least one analog-to-digital converter;
   at least one safety device; and at least one control device connected to the at least one sensor module and configured to actuate the at least one safety device based on output signals of the at least one sensor module, wherein at least two functional units of the plurality of functional units are sensors, wherein the at least one analog-to-digital converter includes a respective analog-to-digital converter for each of the sensors, and wherein at least one functional unit in the plurality of functional units is a voltage converter.

8. The safety system according to claim 7, wherein the at least one control device has digital functional units configured to digitally process the output signals of the at least one sensor module.

9. The safety system according to claim 8, wherein the digital functional units of the at least one control device are configured to digitally preprocess the output signals of the at least one sensor module.

10. The safety system according to claim 7, wherein the safety system is an airbag system.

11. The safety system according to claim 7, the at least one sensor module further comprising at least one of:
a linearizer; and
compensator.

12. The sensor module according to claim 1 further comprising at least one of:
a linearizer; and
compensator.

13. The sensor module according to claim 4, wherein the housing is one of a mold housing, a S08 housing, and a LGA housing.

14. The sensor module according to claim 5, wherein the sensor-specific data is one of balance point temperatures and temperature characteristic curves.

* * * * *